Figure 1:
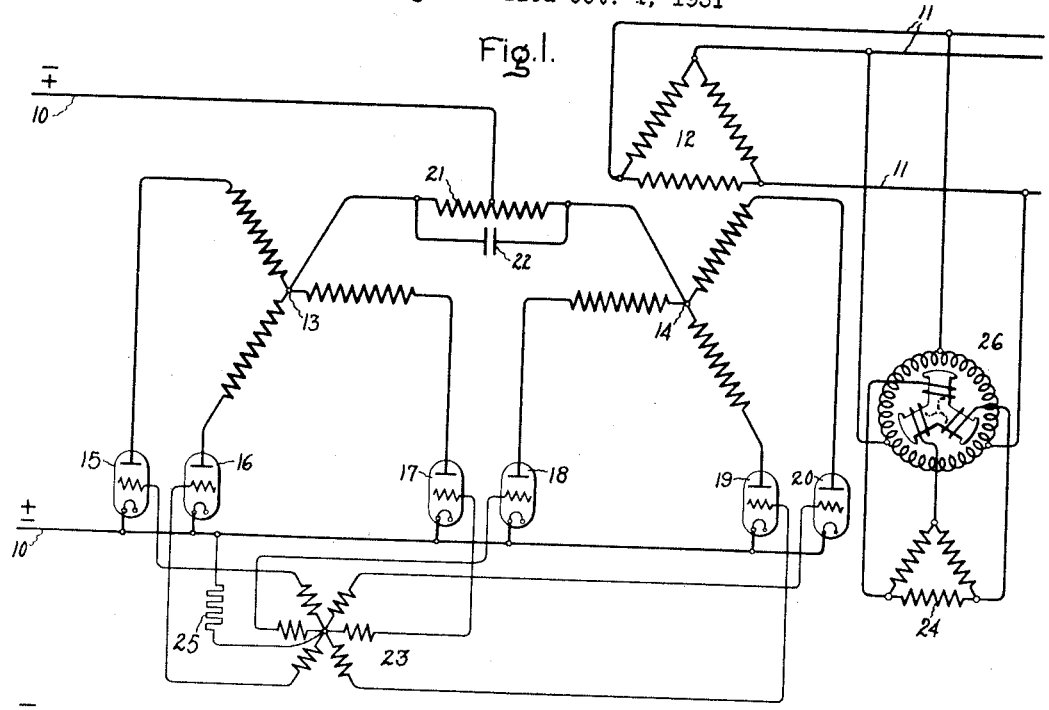

May 1, 1934.　　　　C. A. SABBAH　　　　1,957,229
ELECTRIC VALVE CONVERTING APPARATUS
Original Filed Oct. 1, 1931

Inventor:
Camil A. Sabbah,
by Charles E. Tullar
His Attorney.

Patented May 1, 1934

1,957,229

UNITED STATES PATENT OFFICE 1,957,229

ELECTRIC VALVE CONVERTING APPARATUS

Camil A. Sabbah, Schenectady, N. Y., assignor to General Electric Company, a corporation of New York Application October 1, 1931, Serial No. 566,378
Renewed October 27, 1933

4 Claims. (Cl. 175—363)

My invention relates to electric valve converting apparatus and more particularly to such apparatus adapted to transmit energy between direct and alternating current circuits.

Heretofore, there have been devised numerous apparatus including electric valves for transmitting energy between direct and alternating current circuits or alternating current circuits of different frequencies. When operating such apparatus as a rectifier, transmitting energy from an alternating current circuit to a direct current circuit, it has been customary to control the average voltage of the direct current circuit by retarding the phase of the grid potentials of the several electric valves with respect to their anode potentials. The effect of this type of control is to draw a lagging current from the alternating current circuit, while on the other hand it is usually preferable to draw a leading current in order to improve the power factor of the system. In the majority of the arrangements of the prior art, however, it has not been possible to operate such a controlled rectifier at leading power factors, since this type of operation involves the transfer of the load current from one valve to the next succeeding valve in opposition to the electromotive force of the inductive winding interconnecting the valves. On the other hand, when operating such apparatus as an inverter, transmitting energy from a direct current circuit to an alternating current circuit, it has not been possible ordinarily to supply lagging loads on the alternating current circuit without the provision of an inordinate amount of commutating capacitance. This is due to the fact that a lagging power factor on the alternating current circuit corresponds to a transfer of load between the several electric valves at points in the cycle of alternating potential when the counter electromotive force of the inductive winding connected between the valves opposes such commutation. The same principles apply when transmitting energy from an alternating current circuit of one frequency to an alternating current circuit of another frequency or the same frequency. In many cases, however, it is desirable to supply a lagging power factor alternating current load by means of an electric valve converting apparatus.

Certain arrangements for transmitting energy between direct and alternating current circuits under any desired power factor conditions on the alternating current circuit are disclosed and claimed in my copending application, now Patent No. 1,929,565, and in the United States Letters Patent of C. H. Willis, Patents Nos. 1,929,721, 1,929,722, 1,929,725 and 1,929,726, all assigned to the same assignee as the present application. My invention comprises certain modifications and improvements of the arrangements described in the above mentioned applications.

It is an object of my invention, therefore, to provide an improved electric power converting apparatus for transmitting energy between direct and alternating current circuits under any desired power factor conditions on the alternating current circuit.

It is another object of my invention to provide an improved electric valve converting apparatus for transmitting energy from a direct current supply circuit to an alternating current load circuit under lagging power factor conditions on the alternating current circuit.

It is a further object of my invention to provide an improved electric valve converting apparatus for transmitting energy from an alternating current supply circuit to a direct current load circuit which is capable of drawing a leading power factor current from the alternating current circuit.

In accordance with my invention direct and alternating current circuits are interconnected through a plurality of inductive windings, or inductive networks, and a plurality of electric valves. The inductive windings, or networks, are provided with electrical neutrals which are connected to one side of the direct current circuit through a symmetrical star connected interphase transformer winding. A capacitor is connected between each pair of adjacent terminals of the interphase transformer network so that it is in series circuit relationship with any alternating component of the load current of the apparatus and so that it provides a potential variable in phase in accordance with the valve currents of the apparatus to commutate the current from a valve associated with one of said windings or networks to a valve associated with another winding or network.

For a better understanding of my invention, together with other and further objects thereof, reference is had to the following description taken in connection with the accompanying drawing and its scope will be pointed out in the appended claims. Referring now to the drawing, Fig. 1 illustrates my invention as embodied in a valve converting apparatus of the type known in the art as a double three-phase half wave converting apparatus while Fig. 2 shows my invention as applied to a triple single phase half wave converting apparatus.

Figure 2:
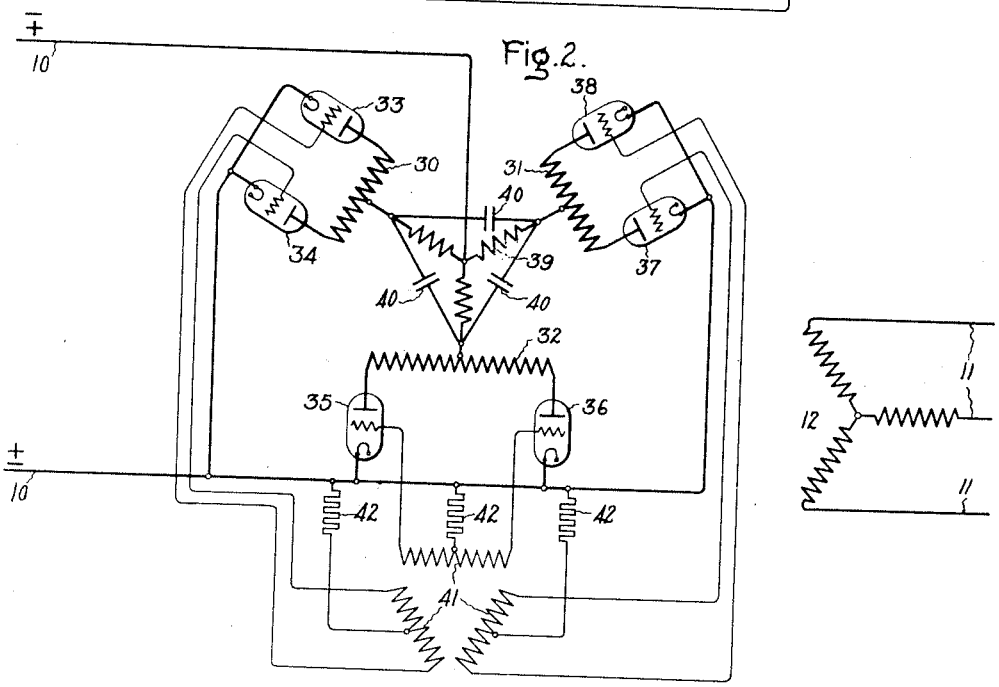

Referring more particularly to Fig. 1 of the drawing, there is illustrated an arrangement for transmitting energy between a direct current circuit 10 and a three-phase alternating current circuit 11. This apparatus comprises a transformer having a winding 12 connected to the alternating current circuit 11 and two star connected windings or networks 13 and 14, the outer terminals of which are connected to one side of the direct current circuit through electric valves 15-20, inclusive. The windings 13 and 14 are provided with electrical neutrals which are connected to the other side of the direct current circuit through opposite halves of an interphase or commutating winding 21 across which is connected a capacitor 22. Each of the several valves 15-20, inclusive, is provided with an anode, a cathode and a control grid and may be of any of the several types well known in the art, although I prefer to use valves of the vapor electric discharge type. The control grids of the several electric valves are connected to their common cathode circuit through the corresponding phase windings of the secondary winding 23 of a grid transformer and a current limiting resistor 25. In case the alternating current circuit 11 is connected to an independent source of electromotive force for determining its frequency and the phase relations of its voltages, the primary winding 24 of the grid transformer may be energized therefrom through any suitable phase shifting means such, for example, as a rotary phase shifting transformer 26. However, in case the alternating current circuit 11 is not connected to an independent source of electromotive force the primary winding 24 of the grid transformer may be energized from any suitable source of alternating potential of a frequency which it is desired to supply the circuit 11, in which case the power factor conditions on the alternating current circuit will be determined solely by the constants of the load circuit. The grid transformer including the windings 23 and 24 should be self saturating or separate saturating transformers should be interposed between this transformer and the grids of the several electric valves or some other means of providing a grid excitation of peaked wave form should be provided since each of the valves should be excited for a period somewhat less than 60 electrical degrees. However, this feature of exciting the grids with a potential of peaked wave form forms no part of my present invention but is disclosed and broadly claimed in a copending application of B. D. Bedford, S. N. 485,335, filed Sept. 29, 1930 and assigned to the same assignee as the present application.

Neglecting the commutating or interphase winding 21 and associated capacitor 22, the general principles of operation of the above described valve converting apparatus will be well understood by those skilled in the art. When the system is operating as a rectifier, current will flow alternately from the transformer networks 13 and 14 through the several electric valves 15-20, inclusive, in a definite phase sequence, the apparatus operating as a six phase rectifier. As is well understood by those skilled in the art, the average voltage of the direct current circuit 10 may be controlled by retarding the phase of the grid potentials as, for example, by means of the rotary phase shifting transformer 26. As stated above, the effect of such control is to draw a lagging power factor current from the alternating current circuit 11, while in most cases it is preferable to draw a leading current from the alternating current circuit in order to improve the power factor of the system. However, in accordance with my invention the winding 21 is designed with a sufficiently low leakage reactance to permit a complete transfer of current from the valves associated with one polyphase winding to the valves associated with the other polyphase winding in an interval something less than 60 electrical degrees. In certain cases it may be desirable to design the winding 21 as a pure autotransformer with a negligible leakage reactance in which case the commutating period is a minimum. If the leakage reactance of the winding 21 be neglected, it will be seen that capacitor 22 is effectively in series with the alternating component of the load current of the apparatus so that, during the interval in which one of the valves is conductive, the capacitor 22 becomes charged to a potential proportional to the load current flowing through the apparatus. For example, if the valve 15 is conducting current and the valve 18 is the next valve to be made conductive, current may be transferred from the valve 15 to the valve 18 even while the electromotive force of the winding associated with the valve 18 is less than that of the winding associated with the valve 15. When the valve 18 is made conductive, the potential of the commutating capacitor 22 opposes the difference in potential between these two phase windings and is effective to commutate the current between the valves. In this manner the current may be transferred between the several electric valves at any point in the cycle of alternating potential corresponding to either the leading or lagging current on the alternating current circuit 11. Since the current is transferred between the transformer networks 13 and 14 six times during each cycle and the alternating component of the current reverses in the winding 21 a corresponding number of times, the potential of the capacitor 22 is a third harmonic of that of the alternating current circuit 11. The operation of this harmonic commutating potential to transfer the current between the several electric valves is explained in more detail in the above mentioned Willis Patent No. 1,929,725.

On the other hand, if the apparatus is operating as an inverter transmitting energy from the direct current circuit 10 to the alternating current circuit 11, current will flow normally from the direct current circuit 10 through one of the windings, for example, that connected to the valve 15 and, without some special provision, this current can be transferred to the next succeeding valve, for example the valve 18, only at a point in the cycle when the counter electromotive force of the winding associated with the valve 18 is less than that associated with the valve 15, which corresponds to a leading power factor on the alternating current circuit 11. On the other hand, it is often desirable to supply a lagging current to the alternating current circuit 11. As in the case of a rectifier the above described apparatus develops a potential across the capacitor 22 which is effective to transfer the current between the valves associated with the winding 13 and the valves associated with winding 14 even though the electromotive force of the windings interconnecting these valves opposes such commutation. In case the alternating current circuit 11 is not connected to an independent source of electromotive force, the grids of the several electric valves may be energized from any suitable source of control potential of a frequency which it is desired to supply to the circuit 11, in which case the power factor thereon will vary in accordance with the constants of the load circuit. On the other hand, if the alternating current circuit 11 is connected to an independent source of electromotive force, the power factor at which energy is transmitted to the circuit 11 may be controlled by operating the rotary phase shifting transformer 26 to vary the phase of the excitation of the several electric valves with respect to the electromotive force of the circuit 11. Under either of the above conditions, it is to be noted that the commutating potential developed by the capacitor 22 depends upon the load current flowing through the apparatus and reaches its maximum value at the instant of commutation so that its maximum effectiveness is utilized.

In Fig. 2 my invention is illustrated as applied to a valve converting apparatus of the type known in the art as a triple single phase half wave converting apparatus. In this arrangement energy may be transmitted between the direct current circuit 10 and the alternating current circuit 11 by means of an apparatus comprising a transformer winding 12 connected to the alternating current circuit 11 and three single phase windings or networks 30, 31 and 32 the outer terminals of which are connected to one side of the direct current circuit 10 through electric valves 33–38 inclusive. Each of the windings 30, 31 and 32 is provided with an electrical neutral and these electrical neutrals are interconnected through a star connected interphase or commutating transformer 39 between the terminals of which are connected the capacitors 40. The transformer 39 is also provided with an electrical neutral which is connected to the other side of the direct current circuit 10. Electric valves 33–38 inclusive are each provided with an anode, a cathode and a control grid and are preferably of the vapor electric discharge type. The control grids of the valves 33–38 inclusive are connected to their respective cathode circuits through the secondary windings 41 of a grid transformer and current limiting resistors 42. In this arrangement, the periods of grid excitation of the valves 33–38 inclusive should be somewhat less than 60°.

The operation of the apparatus described in Fig. 2 is substantially identical with that of Fig. 1. In this arrangement, however, the interphase or commutating transformer is a polyphase network with the result that the load current flows during any given instant through two parallel paths each including one of the interphase windings and a common winding and at each instant one of the capacitors 40 is serially connected in each of these two parallel circuits. In this arrangement, the potential appearing across the capacitors 40, which is effective to commutate the current between the valves associated with the several inductive windings, is a second harmonic of that of the alternating current circuit 11. However, as in the previous arrangement the phase of the harmonic commutating potential automatically varies in accordance with the phase of the valve currents of the apparatus so that the maximum commutating potential is available at the instants of commutation.

While I have described what I at present consider the preferred embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In combination, a direct current circuit, an alternating current circuit, apparatus for transmitting energy therebetween comprising a plurality of inductive windings each provided with an electrical neutral and a plurality of electric valves interconnecting said circuits through said windings, means for controlling the conductivity of said valves to control the power factor conditions on said alternating current circuit, and means for commutating the current between said valves under power factor conditions on said alternating current circuit which tend to oppose such commutation comprising an interphase inductive winding interconnecting said electrical neutrals, a connection from an electrical midpoint of said interphase winding to one side of said direct current circuit, and a capacitor connected across said interphase inductive winding.

2. In combination, a direct current circuit, an alternating current circuit, apparatus for transmitting energy therebetween comprising a plurality of inductive networks, each provided with an electrical neutral, and a plurality of electric valves interconnecting said circuits through said networks, means for controlling the conductivity of said valves, a symmetrical interphase transformer network having a branch for each of said inductive networks and interconnecting said neutrals and a capacitor associated with each branch of said interphase network for producing a periodic potential to commutate the load current between the valves associated with the several transformer windings under any desired power factor conditions on said alternating current circuit.

3. In combination, a direct current circuit, an alternating current circuit, apparatus for transmitting energy therebetween comprising a plurality of inductive networks, each provided with an electrical neutral, and a plurality of electric valves interconnecting said circuits through said networks, means for controlling the conductivity of said valves, a star connected interphase transformer network having a branch for each of said inductive networks and an electric neutral connected to one side of said direct current circuit, the terminals of said network interconnecting said neutrals, and a capacitor connected between each pair of adjacent terminals of said interphase network for producing a periodic potential to commutate the load current between the valves associated with said groups under any desired power factor conditions on said alternating current circuit.

4. In combination, a direct current circuit, a polyphase alternating current circuit, apparatus for transmitting energy therebetween comprising a single phase inductive winding associated with each phase of said alternating current circuit and adapted to be energized in a definite phase sequence, each of said windings being provided with an electrical neutral, an electric valve connected to each terminal of said inductive windings and interconnecting said circuits therethrough, means for controlling the conductivity of said valves, a polyphase star connected inductive network interconnecting said neutrals, and a capacitor connected between each pair of adjacent terminals of said network for commutating the load current between the valves associated with the several inductive windings under any desired power factor conditions on said alternating current circuit.

CAMIL A. SABBAH.